(12) United States Patent
Shoji et al.

(10) Patent No.: US 8,027,050 B2
(45) Date of Patent: Sep. 27, 2011

(54) COMPUTER CONTAINING A PRINT CONTROL PROGRAM, THE PROGRAM, AND PROGRAM RECORDING MEDIUM

(75) Inventors: Koichiro Shoji, Zama (JP); Takashi Nozaki, Zama (JP)

(73) Assignee: Science Park Corporation, Kanagawa (JP)

( * ) Notice: Subject to any disclaimer, the term of this patent is extended or adjusted under 35 U.S.C. 154(b) by 1106 days.

(21) Appl. No.: 10/546,599

(22) PCT Filed: Feb. 25, 2004

(86) PCT No.: PCT/JP2004/002178
§ 371 (c)(1),
(2), (4) Date: Aug. 23, 2005

(87) PCT Pub. No.: WO2004/077287
PCT Pub. Date: Sep. 10, 2004

(65) Prior Publication Data
US 2006/0153617 A1   Jul. 13, 2006

(30) Foreign Application Priority Data
Feb. 26, 2003   (JP) .................................. 2003-48791

(51) Int. Cl.
G06F 3/12 (2006.01)
G06F 15/00 (2006.01)
G06F 3/00 (2006.01)
G06F 9/44 (2006.01)
G06K 1/00 (2006.01)
H04N 1/60 (2006.01)

(52) U.S. Cl. .......................... 358/1.15; 358/1.9; 719/321

(58) Field of Classification Search .................... 358/1.1, 358/1.11, 1.13, 1.15, 1.16
See application file for complete search history.

(56) References Cited

U.S. PATENT DOCUMENTS

| 6,930,787 B1* | 8/2005 | Hayasaki ..................... 358/1.14 |
| 7,064,849 B1* | 6/2006 | Nishikawa et al. ........... 358/1.15 |
| 7,190,477 B2* | 3/2007 | Ferlitsch ..................... 358/1.15 |
| 7,287,273 B2 | 10/2007 | Shoji et al. |
| 7,395,541 B2 | 7/2008 | Shoji et al. |
| 2001/0034244 A1* | 10/2001 | Calder et al. .................. 455/556 |
| 2002/0054337 A1* | 5/2002 | Makishima et al. ......... 358/1.15 |
| 2002/0060805 A1* | 5/2002 | Tomita ......................... 358/1.15 |
| 2002/0138564 A1* | 9/2002 | Treptow et al. ............... 709/203 |
| 2004/0122997 A1* | 6/2004 | Diamant ......................... 710/49 |

FOREIGN PATENT DOCUMENTS

| EP | 0 893 766 A2 | 1/1999 |
| JP | 11-85415 | 3/1999 |
| WO | WO/02/091195 | 11/2002 |

* cited by examiner

Primary Examiner — Chan S Park
Assistant Examiner — Ming Hon
(74) Attorney, Agent, or Firm — Westerman, Hattori, Daniels & Adrian, LLP

(57) ABSTRACT

A computer storing a print control program, the program, and a recording medium containing the program according to the present invention control access from the computer to a printer in the kernel mode.
When access is made from an application program (4) to a printer (69), a spooler (65) operates. An access request is detected in response to an event occurring when the spooler (65) operates. A common interface driver (7) controls data output to the printer (69) at a filter (41) or the spooler (65) according to a control condition previously registered in a control condition database (36).

23 Claims, 14 Drawing Sheets

Fig. 2

| Filename | Type of Control ||||||| |
| --- | --- | --- | --- | --- | --- | --- | --- |
| | Print Stop | Load | Blank Printing | Watermark | Print Completion Notification | Write Success Notification | Spooler Read Disabling |
| File 1 | ○ | | | | | | |
| File 2 | | ○ | | | | | |
| File 3 | | | ○ | | | | |
| File 4 | | | | ○ | | | |
| File 5 | | | | | ○ | | |
| File 6 | | | | | | ○ | |
| File 7 | | | | | | | ○ |

Fig.9

| User | Printed File Name | Application | Printer | Print Condition | Date | Type of Control |
|---|---|---|---|---|---|---|
| User1 | File 1 | Word processor | Printer1 | Print one copy | 2002/11/01 10:45:05 | Print stop |
| User2 | | | | | | |
| User3 | | | | | | |
| ... | | | | | | |
| | | | | | | |

Fig. 14

Example of Control Condition Database

| File | Printable Period Start time – End time | Unprintable Application | User | Control |
|---|---|---|---|---|
| FileA | 10:00 – 15:00 | Word processor | UserX | Print inhibit |
| FileB | 10:00 – 15:00 | Computation software | UserY | Print permission |
| FileC | | | | Print permission |
| ... | | | | |
| | | | | |

COMPUTER CONTAINING A PRINT CONTROL PROGRAM, THE PROGRAM, AND PROGRAM RECORDING MEDIUM

TECHNICAL FIELD

The present invention relates to a computer storing a control program for controlling access to a peripheral device from the computer, and also relates to the program and a recording medium containing the program. More particularly, the present invention relates to a computer storing a print control program for controlling access to a printer from the computer, and also relates to the program and a recording medium containing the program. Even more particularly, the present invention relates to a print control program for controlling the acquisition of a log of access to a printer from a computer and the storage of the access log and also controlling printing and data to be printed.

BACKGROUND ART

There are occasions where an operation such as document preparation or image processing is executed by software operating on a computer, and the operation result or a file already stored in a storage medium of the computer is sent to an external printer to perform printing. Printing from the software to the printer is performed through services provided by an OS (Operating System) and a printer driver that controls the printer connected to the computer and via a printer port.

[Outline of Computer]

A computer comprises many hardware resources such as a central processing unit (CPU), storage devices (a memory, a hard disk, etc.), input devices (a keyboard, a mouse, etc.), output devices (a display, etc.), and card slots for connecting to peripheral devices (a printer, a scanner, etc.). These hardware devices operate under the control of an OS stored in a storage device.

Various application programs used in the computer run under the OS. The OS provides basic functions used mutually by many application programs, e.g. input/output functions such as keyboard entry and screen output, and management of a disk and memory, and controls the whole system of the computer.

The hardware devices of the computer and peripheral devices are produced by a plurality of manufacturers, and the specifications thereof may differ among manufacturers. The OS controls all the operations of the computer and absorbs differences in specifications of different hardware devices to provide an environment common to application programs.

Developers of application programs can save the time and labor for development and unify the operability of the application programs by making use of functions provided by the OS. An application program developed for use with a certain OS can basically be used in any computer in which the OS can run.

There are a large number of different kinds of OS, represented by MS-DOS (registered trademark), UNIX (registered trademark), Linux, FreeBSD (registered trademark), etc. Among them, Windows (registered trademark) series available from Microsoft is the most popular OS for use by corporations and general home users. Mac OS (registered trademark) available from Apple is widely used in the DTP industry and the multimedia industry. Servers of corporations and scientific institutions often use UNIX (registered trademark)-based OS's developed by various companies and UNIX (registered trademark)-based OS's such as Linux and FreeBSD (registered trademark), which are distributed without charge. In recent years, Windows NT (registered trademark) and Windows 2000 (registered trademark) available from Microsoft have been increasing the share of the market as OS's for servers.

[Outline of Printer Driver]

FIG. 11 shows the arrangement of a printer driver of Windows 2000, which is a typical OS, and the related services, and outlines the operation thereof. A computer 1 operates under an OS 3. When an application program 4 running on the OS 3 outputs to a printer 69, complicated processing is executed.

The OS 3 has two operating modes, i.e. a kernel mode 8 and a user mode 9. In the kernel mode 8, all instructions for operating the OS 3 are executable. If an erroneous instruction is executed, there may be an adverse effect on the whole system. The user mode 9 is completely open to the user to run an application program, etc.

In the user mode 9, instructions for operating the OS 3 are limited so that an adverse effect is not exerted on the system. Because execution of instructions that may have an adverse effect on the system is limited, an environment easy for the user to use is provided. The OS provides many system functions to operate the computer. System functions automatically activated when the OS is started or modules for implementing the functions are referred to as "services".

FIG. 11 shows services, such as a GDI32 (61), a GRE (GDI Rendering Engine) 62, a printer graphic driver 63, a printer interface driver 64, a spooler 65, a language monitor 66, and a port monitor 67. FIG. 11 further shows a printer device driver 68 for controlling the printer 69.

These services operate in either the kernel mode 8 or the user mode 9. The printer device driver 68 operates in the kernel mode 8. The GDI32 (61) is an abbreviation for "Graphic Device Interface" for 32-bit systems, which is a service providing an interface that is concerned with output to a device, such as plotting, device context, metafile, coordinates, font, etc.

The GRE 62 is a service for generating data for printing. Regarding inherent functions of the printer 69, e.g. the model or type thereof, the GRE 62 calls the printer graphic driver 63 to generate data for printing. The printer graphic driver 63 operates in the kernel mode 8 to generate data for printing. The printer graphic driver 63 generates RAW data (described later).

The printer interface driver 64 generates data for printing in the user mode 9. The printer interface driver 64 provides the function of making various settings regarding printing, e.g. a number of copies to be printed, a type of paper used, and black-and-white/color printing setting.

The spooler 65 is a service for temporarily storing data for printing in a storage medium and for managing output to the printer 69. The language monitor 66 provides a service for converting data for printing from the spooler 65 to printable data. Further, the language monitor 66 provides a service for interpreting information from the printer 69. For example, the language monitor 66 provides information concerning the printer 69, e.g. a paper jam, or a toner-out condition, to a higher-order service and the user. The port monitor 67 controls and monitors a port used for printing.

The printer device driver 68 controls the printer 69 directly. The printer interface driver 64, the GRE 62 and the language monitor 66 provide standard functions provided by the OS 3. However, the printer 69 has unique functions depending on the model or type thereof. These unique functions are supported by a driver program, e.g. a mini-driver, supplied by the manufacturer.

The printer interface driver 64 provides the above-described unique functions that call the mini-driver. The printer graphic driver 63 is mostly provided by the manufacturer supplying the printer 69. The printer graphic driver 63 can provide functions unique to the printer 69. The language monitor 66 is generally different for each model or type of the printer 69 and supplied by the manufacturer.

Data for printing is temporarily stored in a storage medium, e.g. a memory or a hard disk, (this is called "spooling"). When the printer 69 is ready to process it, or when there is a request from the printer 69, the stored print data is sent to the printer 69 to print it. This operation is executed by the spooler 65. In Windows, two formats, i.e. EMF (Enhanced Metafile Format), and RAW, are used for data for spooling that is passed to the spooler 65.

EMF is a format for printers developed for use in 32-bit Windows systems. EMF data can be generated by an application program or the like. However, printers that can receive and print EMF data are limited to those compatible with EMF. A printer that is not compatible with EMF needs to convert EMF data to RAW data to print it. RAW data depends on the model of printer 69. Therefore, RAW data is generated by a driver corresponding to each individual printer 69.

[Flow of Printing]

The following is an outline of the flow of print data when printing is performed from the application program 4 to the printer 69. The application program 4 sends a print request to the GDI32 (61). The print request and output data from the application program 4 are transmitted to the GDI32 (61) operating in the user mode of the OS 3. If the format of the data is EMF, the GDI32 (61) sends the data to the spooler 65 as data for spooling.

If the format of the data is not EMF, the GDI32 (61) passes the data to the GRE 62. The GRE 62 calls the printer graphic driver 63 to generate data for spooling from the data. The generated data for spooling is sent to the printer interface driver 64. The printer interface driver 64 makes various settings for printing and passes the data to the spooler 65.

The spooler 65 spools the data to create a temporary file and stores it in the hard disk. The spooler 65 reads the temporary file and passes the data to the language monitor 66. The language monitor 66 generates printable print data suitable for the printer 69. The print data is transmitted to the printer device driver 68 through the port monitor 67.

The procedure of printing to the printer 69 will be described below with reference to the flowchart of FIG. 12. The application program 4 sends a print request to the GDI32 (61) (S300) and transmits data to be printed thereto. The GDI32 (61) receives the print request and data (S301) and analyzes the data (S302). Then, the GDI32 (61) judges the format of the data (S303). If the data format is EMF (if "Yes" is the answer), the GDI32 (61) sends the data to the spooler 65 as data for spooling (S315→S316).

If the data format is not EMF (if "No" is the answer), the GDI32 (61) passes the data to the GRE 62 (S304). The GRE 62 receives the data (S305), calls the printer graphic driver 63, and passes the data thereto (S306). The printer graphic driver 63 receives the data (S307) and generates data for spooling (S308). The printer graphic driver 63 passes the generated data for spooling to the GRE 62 (S309). The GRE 62 receives the data for spooling (S310) and sends it to the printer interface driver 64 (S311).

The printer interface driver 64 receives the data for spooling (S312), makes various settings for printing (S313), and transmits the data to the spooler 65 (S314→S316). The spooler 65 receives the data for spooling (S316), spools the data to create a temporary file (S317), and stores it in the hard disk (S318). The temporary file is read by the spooler 65 and passed to the language monitor 66 (S319). The language monitor 66 generates data for printing from the temporary file (S320) and sends it to the port monitor 67 (S321).

The port monitor 67 receives the data for printing (S322) and sends it to the printer device driver 68 (S323). The printer device driver 68 finally transmits the data for printing to the printer 69 (S324). Thus, the data requested to be printed from the application program 4 is printed. While being transmitted to the printer device driver 68, the spooled data is under supervision of the language monitor 66 and the port monitor 67.

International Publication No. WO 02/091195 discloses a common interface that operates in the kernel mode to perform transmission and reception of data between device drivers of a computer. The proposed common interface is not concerned with a technique whereby a print history is obtained to manage and limit the user's print operation for the purpose of security and so forth.

Meanwhile, it is important to manage the operation of printing from a computer to a printer and also the data to be printed from the viewpoint of security, i.e. protection of private information, and management of secret data. Accordingly, there are occasions where it is necessary to obtain a print history and to limit the user's print operation. It is sometimes desirable to perform print control when a specific file is to be printed, for example, by suspending the print operation, or printing fake data in place of the actual print data.

However, it is difficult to perform such print control with an OS used in a computer. Print data is sent to a printer through a plurality of services and device drivers of the OS that operate in the user or kernel mode and through a series of complicated operations thereof. Therefore, it is difficult to accurately control print data under print control. Controlling a driver operating in the kernel mode may cause an unstable operation of the OS. Therefore, the conventional print control system does not perform such control.

DISCLOSURE OF THE INVENTION

With the above-described technical background, the present invention was made to attain the following objects.

An object of the present invention is to provide a computer storing a print control program that performs print control, e.g. stopping or suspension of printing, or replacement of print data with fake data, when access is made from the computer to a printer to print data, and also provide the program and a recording medium containing the program.

Another object of the present invention is to provide a computer storing a print control program that controls access from the computer to a printer in the kernel mode, and also provide the program and a recording medium containing the program.

Still another object of the present invention is to provide a computer storing a print control program that obtains a log of access to a printer from the computer in the kernel mode, and also provide the program and a recording medium containing the program.

A further object of the present invention is to provide a computer storing a print control program that transfers a log of access to a printer from the computer to a network, and also provide the program and a recording medium containing the program.

A still further object of the present invention is to provide a computer storing a print control program that controls printing according to a predetermined condition when specific access is made to a printer from the computer, and also provide the program and a recording medium containing the program.

A computer storing a print control program, the program, and a recording medium containing the program according to the present invention have the following advantages.

The present invention can accurately grasp data to be printed from an application program and also grasp an application program making a print request and a user. Further, the present invention can perform print control according to the grasped matter under flexible conditions, such as stopping or suspension of printing, replacement of print data with fake data, and restriction of printing within a designated printable period of time.

In the present invention, access to the printer from the computer is controlled in a kernel mode that is an operating mode of an OS used in the computer. The access control is performed by using a database. Therefore, it is possible to freely control access to a file, and it becomes possible to perform predetermined control simply by changing the database.

In the present invention, print output is controlled by using an interface common to an application program and device drivers and utilizing the program of the interface driver. Therefore, the confidentiality of data is protected, and safe transfer of data can be achieved.

That is, a computer according to a first feature of the present invention has a print control program stored therein. The print control program includes detecting means (43) that detects, when print data is output to a printer (69) from the computer operating under an operating system (OS), a print request and output data sent from an application program (4) running on the operating system to the printer (69) to perform printing. The print control program further includes a spooler (65) that processes the output data to generate the above-mentioned print data, temporarily stores the generated print data in a storage medium, and outputs the print data to the printer (69). Further, the print control program includes control means (7, 41) that controls the output data sent from the application program (4) to the printer (69) to perform printing.

The control means (7, 41) includes a common interface driver (7) that operates in a kernel mode in which all instructions for the operating system (OS) are executable, to perform transmission and reception of data between a plurality of device drivers. The control means (7, 41) further includes a supervising section (43) that operates in a user mode of the operating system (OS) to supervise events generated by the operating system (OS). Further, the control means (7, 41) includes a filter (41) that operates in the kernel mode, in which all instructions for the operating system (OS) are executable. The filter (41) is inserted upstream of a printer device driver (68), which controls the printer (69), to control the print data sent from the spooler (65) to the printer (69).

The common interface driver (7) includes an application interface section (17) that is an interface between the common interface driver (7) and the application program. The common interface driver (7) further includes a printer output supervising driver section (42) that checks a control condition for controlling the print data and transmits an instruction for control to the filter (41). Further, the common interface driver (7) includes a data input/output section (20, 30) that makes access to a storage device to obtain the control condition and passes it to the printer output supervising driver section (42).

The supervising section (43) detects the print request in response to an event occurring when the spooler (65) operates, and passes the detected print request to the printer output supervising driver section (42) through the application interface section (17).

The printer output supervising driver section (42) receives the print request and transmits a control instruction corresponding to the print request to the filter (41). The filter (41) controls the print data according to the predetermined control condition in response to the control instruction.

In the print control program-stored computer according to a second feature of the present invention, the supervising section (43) detects the print request in response to an event occurring when the spooler (65) operates, and passes the detected print request to the printer output supervising driver section (42) through the application interface section (17). The printer output supervising driver section (42) receives the print request and controls a spooler temporary file created and stored by the spooler (65) according to the control condition.

In the print control program-stored computer according to a third feature of the present invention, the control means (7, 41) includes a second printer output supervising driver section (48). The output data is passed to the spooler (65) through the second printer output supervising driver section (48). The second printer output supervising driver section (48) receives the control condition and the control instruction from the printer output supervising driver section (42) and controls the print data.

In the print control program-stored computer according to a fourth feature of the present invention, the second printer output supervising driver section (48) detects the print request when the output data is sent to the spooler (65), and passes the detected print request to the printer output supervising driver section (42) through the application interface section (17). The printer output supervising driver section (42) receives the print request and transmits a control instruction corresponding to the print request to the filter (41). The filter (41) controls the print data according to the predetermined control condition in response to the control instruction.

Preferably, the control condition is at least one selected from the group consisting of stopping output of the print data, changing the output speed of the print data, and repeatedly outputting a part of the print data.

It is also preferable that the control condition should be at least one selected from the group consisting of changing the attribute of the spooler temporary file, changing the contents of the spooler temporary file, and a control whereby the contents of the spooler temporary file are deleted to make the file empty.

Further, the control condition is preferably one or a combination of a file to be subjected to the print control, a printable time period indicating a period of time during which printing can be performed, an application program that cannot print the above-mentioned file, a user, and a type of control.

Preferably, the detecting means comprises the step of activating a hook program in response to the event when it occurs. The hook program has the transmitting step of informing the control means of the occurrence of the event.

Preferably, the control means has the function of obtaining a log of execution of the print control and storing it in a log database. Preferably, the log database comprises a user column showing a user who performed printing, a printed filename column showing a file that was printed, an application program column showing an application program that executed printing, a printer column showing a printer that printed, a print condition column showing a condition setting with which printing was performed, a date column showing the date at which printing was performed, and a print control column showing whether or not print control was effected.

Although the first to fourth features of the present invention are concerned with a computer having a print control program stored therein, the present invention may include the print control program or a medium having the print control program recorded therein.

BRIEF DESCRIPTION OF THE DRAWINGS

FIG. 2 is a diagram showing the arrangement of a control condition database.

FIG. 9 is a diagram showing an example of a log file.

FIG. 14 is a diagram showing the arrangement of a control condition database.

BEST MODE FOR CARRYING OUT THE INVENTION

Figure 1:
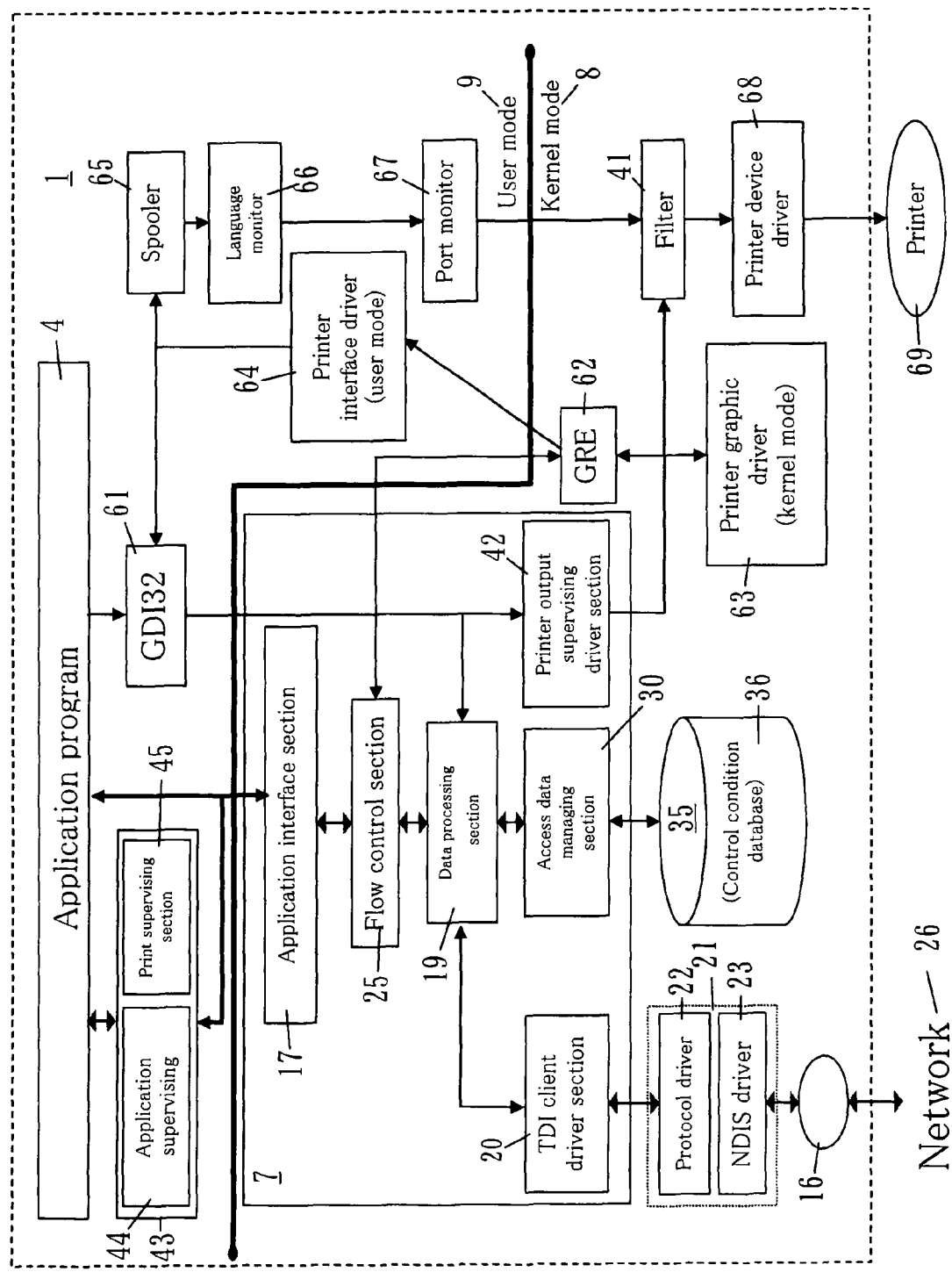
FIG. 1 is a conceptual view showing the outline of the function of a print control program stored in a computer according to a first embodiment of the present invention.

Embodiments of the present invention will be described below. FIG. 1 is a conceptual view showing the function of a print control program stored in a computer according to a first embodiment of the present invention.

A common interface driver 7 operates in a kernel mode 8. The common interface driver 7 provides a common interface for a program and services running in a user mode 9, e.g. an application program 4, to drivers operating in the kernel mode 8. The common interface driver 7 also performs the function of providing a common interface that allows transmission and reception of data between drivers operating in the kernel mode 8. The common interface was proposed by the present inventors and is publicly known from International Publication No. WO 02/091195 and so forth. Moreover, the common interface is not concerned with the subject matter of the present invention. Therefore, a detailed description thereof is omitted.

The common interface driver 7 comprises an application interface section 17, a flow control section 25, a data processing section 19, a TDI client driver section 20, an access data managing section 30, a printer output supervising driver section 42, and so forth. The function of each section is as follows.

The application interface section 17 provides an interface between the application program 4 and the common interface driver 7. The application interface section 17 receives a command such as a file access request from the application program 4 and transmits the result of execution of the command or other data received from the flow control section 25 to the application program 4. The data processing section 19 performs input and output of data to and from the access data managing section 30 and the TDI client driver section 20.

The TDI client driver section 20 is an interface between a network driver 21 and the common interface driver 7. The network driver 21 comprises a protocol driver 22 and an NDIS (Network Driver Interface Specification) driver 23. The network driver 21 controls a network card 16 to establish connection and to control a protocol when data is transmitted to a network 26.

The protocol driver 22 controls a communication protocol when data is transferred to the network 26. The NDIS driver 23 provides an interface between the protocol driver 22 and the network card 16. The TDI client driver section 20 receives packeted data from the data processing section 19 and outputs it to the protocol driver 22.

The flow control section 25 analyzes an instruction and so forth from the application program 4 received through the application interface section 17 and gives instructions to the data processing section 19, the printer output supervising driver section 42, etc. to control the flow of data. A database 35 is stored in a hard disk or other auxiliary storage device. The database 35 contains information concerning users' files. The access data managing section 30 references the database 35, enters data thereinto, and controls it.

The common interface driver 7 includes a printer output supervising driver section 42 and so forth. The printer output supervising driver section 42 supervises the output of data to the printer 69 and controls the output to the printer 69 according to need. The printer output supervising driver section 42 obtains a log of printer output to the printer 69 and stores the printer output log in the hard disk of the computer 1 through other functional sections 19, 20, 30, 25, etc. of the common interface driver 7. It is also possible for the printer output supervising driver section 42 to transmit the printer output log to another computer through the network card 16 and the network 26 and to store it in the computer.

The printer output supervising driver section 42 controls the output to the printer 69 according to a control condition preset in the database 35. For example, when a user is going to print a specific file, the printer output supervising driver section 42 restricts, suspends or stops the user's printing operation. Alternatively, the printer output supervising driver section 42 replaces print data that the user is going to print with other data and prints it. The printer output supervising driver section 42 can also perform a control whereby printing to the printer 69 is made very slowly.

It is, needless to say, possible to inform the administrator or the administrative server of these controls. It is also possible for the administrative server (not shown) to change or suspend/resume the control performed on the output to the printer 69 by accessing the computer 1 through the network 26 and changing the contents of the database 35. The administrative server can also control the output to the printer 69 by sending an instruction to the flow control section 25. In response to the instruction, the flow control section 25 instructs the printer output supervising driver section 42 to control the output to the printer 69.

The data processing section 19 has the function of generating a log of printing on the basis of information from the flow control section 25 and the printer output supervising driver section 42 and storing the log in the database 35.

Further, the data processing section 19 sends the log to the TDI client driver section 20 to transmit it to another computer connected to the network 26.

In the user mode 9, an interface section 43 is provided. The interface section 43 mainly provides an interface between the common interface driver 7 and services of the OS 3 that operate in the user mode 9 as well as the application program 4. The interface section 43 includes an application supervising section 44 that supervises the operating condition of the application program 4 and provides an interface. The interface section 43 further includes a print supervising section 45 that supervises print-related services, e.g. the spooler 65.

Transfer of information from the spooler 65 to the common interface driver 7 is performed through the print supervising section 45. The common interface driver 7 can perform transmission and reception of data directly with the application program 4, etc.

The database 35 includes a control condition database 36 having files and data concerning control therefor. The control condition database 36 comprises a table 100 as shown in FIG. 2. The table 100 shows control conditions such as a restriction to be imposed when a file is printed. The table 100 consists of columns respectively entitled "Filename" 101 and "Type of Control" 102. The column of "Filename" 101 is a list of files to be subjected to print control.

The column of "Type of control" 102 shows the type of control preset for each file shown in the column of "Filename" 101. Control is effected in the form of an instruction sent from the printer output supervising driver section 42 to the filter 41. For example, the column of "Type of Control" 102 consists of columns respectively entitled "Print Stop" 103, "Load" 104, "Blank Printing" 105, "Watermark" 106, "Print Completion Notification" 107, "Write Success Notification" 108, and "Spooler Read Disabling" 109. The "Print Stop" 103 is a control whereby printing of a target file is stopped. The printer output supervising driver section 42 instructs the filter 41 not to output print data to the printer 69.

"Load" 104 is a control whereby the operation of printing a target file is delayed, i.e., a load is imposed on the printing operation. The printer output supervising driver section 42 instructs the filter 41 to output print data to the printer 69 with a time delay. "Blank Printing" 105 is a control whereby a blank page is printed instead of printing a target file. The printer output supervising driver section 42 instructs the filter 41 to delete the print data but to output data for printing a blank page to the printer 69 instead.

"Watermark" 106 is a control whereby the print of a target file is watermarked with a special character or sentence. The printer output supervising driver section 42 instructs the filter 41 to output print data to the printer 69 with a watermark loaded thereon. "Print Completion Notification" 107 is a control whereby when a target file is to be printed, completion of printing from the printer device driver 68 to the printer 69 is pretended, and fake information is reported. When this control is performed, the printer output supervising driver section 42 instructs the filter 41 to transmit a massage stating the completion of printing.

"Write Success Notification" 108 is a control performed when the spooler 65 creates a temporary file and writes it in the hard disk, to make a notification to the effect that writing to the spooler 65 has succeeded. When this control is performed, the contents of the created temporary file are deleted to make the file empty. "Spooler read disabling" 109 is a control whereby the attribute of the temporary file created by the spooler 65 is changed so that the temporary file cannot be reread by the spooler 65, thereby stopping the printing.

(Method of Print Control)

To control the output to the printer 69, a print request output from the application program 4 or the like is detected. Upon detection of the print request, the control system controls print data sent from the application program 4 to the printer 69. Detection of the print request is made by utilizing the function of the spooler 65 to create a temporary file. Print control that controls a print operation or print data is performed by controlling any of the following: the function of transmitting print data to the printer device driver 68, which operates in the kernel mode 8; spooling; and access to the printer.

Spooled data for printing is transmitted to the printer device driver 68 through the language monitor 66 and the port monitor 67. The port monitor 67 monitors a port used to output, to the printer 69 and transmits the print data to the printer device driver 68 when the printer 69 is ready to process it. The printer device driver 68 is a driver device for actually controlling hardware, which controls the printer 69 directly to perform print processing.

(Detection of Print Request)

The detection of a print request will be described with reference to FIG. 3. The spooler 65 receives data for spooling sent from the GDI32 (61) or the printer interface driver 64. When the spooler 65 starts spooling, a spooling event occurs. The event is an action taking place when the operating state of a hardware or software device changes, whereby other hardware or software is informed of the change in the operating state. The spooling event shows that spooling is being performed.

Spooling events have previously been registered in an event management section of the OS 3. When a spooling event occurs, a hook program 71 that has been registered in association with the spooling event starts operation. The hook program 71 interrupts the spooling program to activate a hook program 73.

The hook program 73 starts (S1) and informs the common interface driver 7 of the occurrence of a print event (S2). Then, the hook program 73 waits for a reply from the common interface driver 7 (S3). When receiving a notice of receipt from the common interface driver 7, the hook program 73 terminates (S4, S5). Then, the program body 72 of the spooling program starts.

Thus, spooling of the data is continued. The spooling process has been explained above in detail in connection with the prior art. Therefore, a description thereof is omitted.

(Procedure of Print Control)

Figure 4:
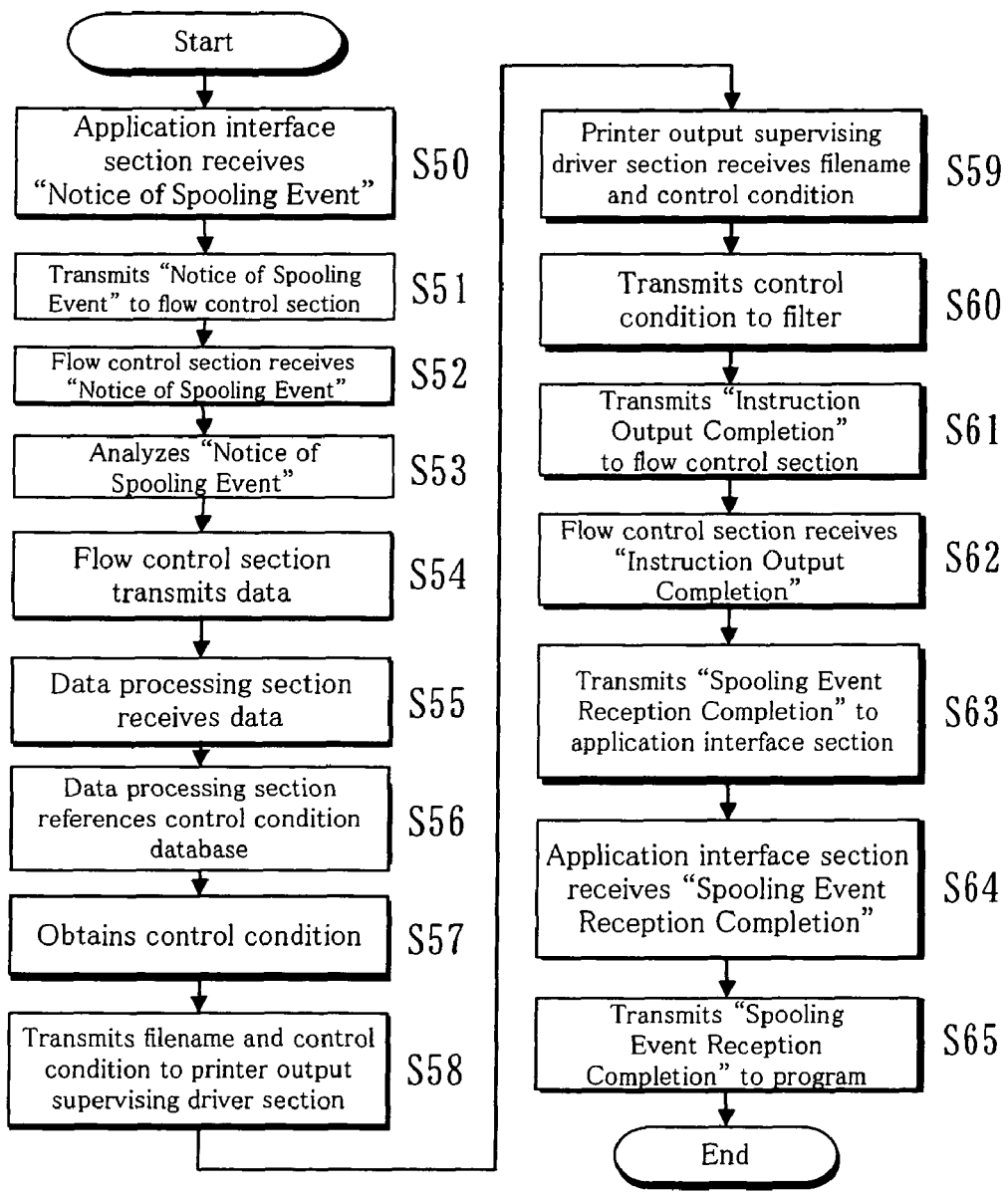
FIG. 4 is a diagram showing the operation of a common interface driver.

Next, the procedure of print control during printing will be described with reference to the flowchart of FIG. 4. The print supervising section 45 supervises all spooling events. When a spooling event occurs, the print supervising section 45 generates a "Notice of Spooling Event" in association with an application program 4 that made the print request. The "Notice of Spooling Event" is sent to the application interface section 17.

The application interface section 17 receives the "Notice of Spooling Event" (S50) and transmits it to the flow control section 25 (S51). The flow control section 25 receives the "Notice of Spooling Event" from the application interface section 17 (S52) and analyzes it (S53). Then, the flow control section 25 transmits data to the data processing section 19 (S54).

The data processing section 19 receives the data (S55) and references the control condition database 36, which has been registered in the database 35 (S56). The data processing section 19 refers to the table 100 showing control conditions associated with the names of files, and obtains a control condition preset in association with the filename 101 of a file to be printed (S57). In actuality, the data processing section 19 accesses the database 35 through the access data managing section 30. A description thereof is omitted for the sake of simplicity.

The data processing section 19 transmits the filename 101 and control condition obtained to the printer output supervising driver section 42 (S58). For example, the data processing section 19 refers to the table 100 shown in FIG. 2 and obtains the control condition of "Print Stop" when "File 1" in the column of "Filename" 101 is to be printed, and transmits "File 1" and "Print Stop" to the printer output supervising driver section 42.

The printer output supervising driver section 42 receives the filename and the control condition (S59) and transmits the control condition to the filter 41, which is provided in between the printer device driver 68 and the port monitor 67 (S60). Further, a notice of "Instruction Output Completion" is transmitted to the flow control section 25 (S61).

The flow control section 25 receives "Instruction Output Completion" (S62) and transmits "Spooling Event Reception Completion" to the application interface section 17 (S63). The application interface section 17 receives "Spooling Event Reception Completion" (S64) and informs the hook program 73 of "Spooling Event Reception Completion" (S65). Thus, a series of print control condition setting operations are completed.

(Print Control Flow 1)

Figure 5:
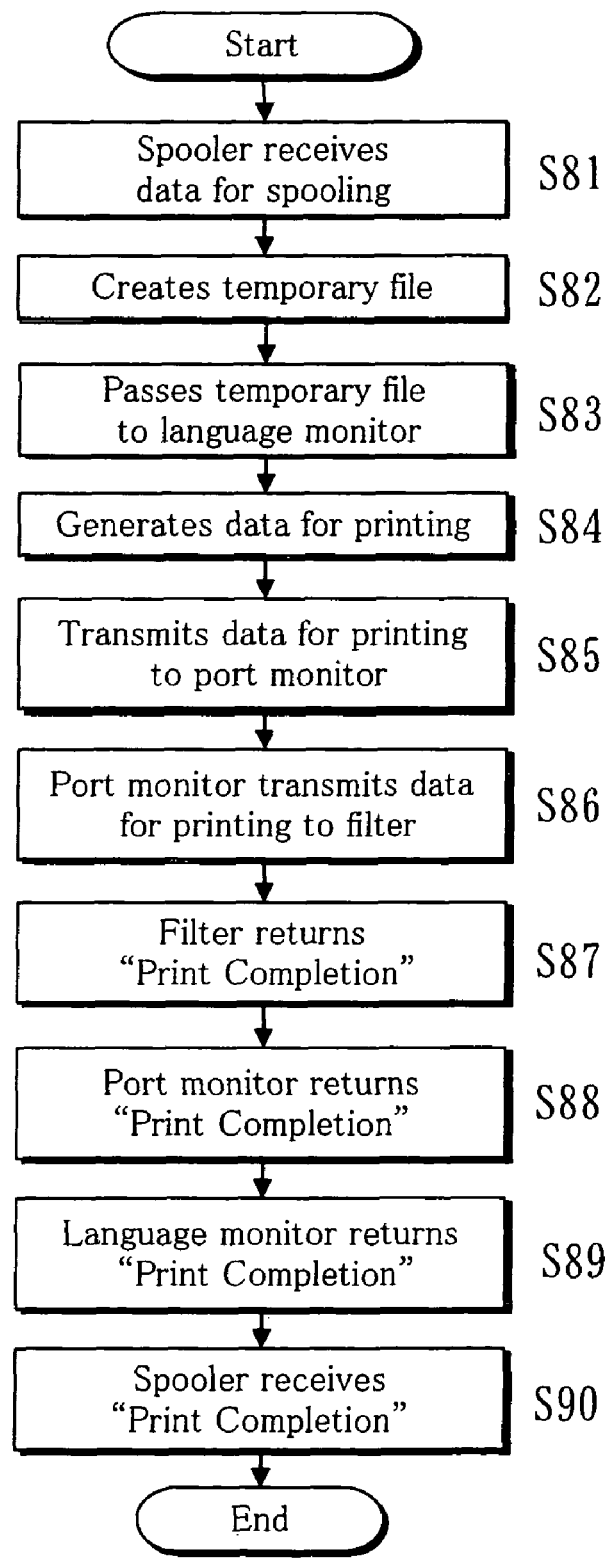
FIG. 5 is a flowchart showing the flow of print control.

FIG. 5 is a flowchart showing an example of the print control flow. This is an example of control in which the actual printing is not performed, but a "Print Completion" signal that is a false signal is transmitted. The spooler 65 receives data for spooling (S81), creates a temporary file (S82), and stores it in the hard disk. The spooler 65 rereads the temporary file and passes it to the language monitor 66 corresponding to the printer 69 (S83). The language monitor 66 generates data for printing (S84) and passes it to the port monitor 67 (S85). The port monitor 67 transmits the data for printing to the filter 41 (S86).

The filter 41 receives the data for printing and returns a message stating "Print Completion" to the port monitor 67 (S87). The port monitor 67 receives "Print Completion" and transmits it to the language monitor 66 (S88). The language monitor 66 receives "Print Completion" and transmits it to the spooler 65 (S89). The spooler 65 receives "Print Completion" and transmits it to the application program 4 (S90).

(Operation of Filter 41)

Figure 6:
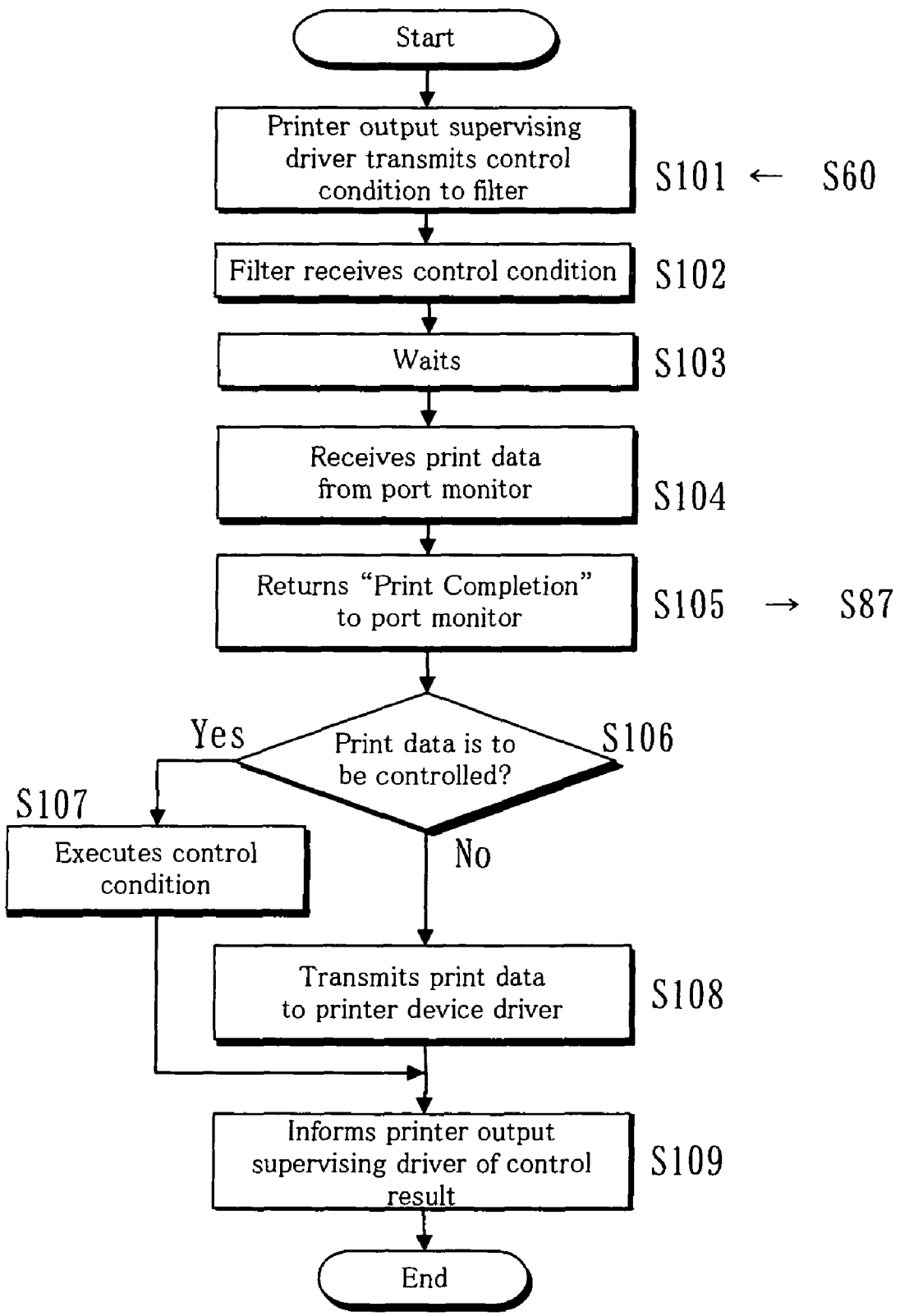
FIG. 6 is a flowchart showing the operation of a filter.

FIG. 6 is a flowchart showing the operation of the filter 41 in the case of the above-described "Print Completion" control. The printer output supervising driver section 42 transmits the control condition to the filter 41 (S60→S101). The filter 41 receives the control condition (S102) and waits (S103). The filter 41 waits until an instruction from the printer output supervising driver section 42 or print data from the port monitor 67 is transmitted thereto. The filter 41 receives print data from the port monitor 67 (S104).

Upon completion of the reception of the print data, the filter 41 returns the message of "Print Completion" to the port monitor 67 (S105→S87). The control condition for the print data is judged (S106). If the print data comes under the control condition (if "Yes" is the answer), the control condition is executed (S107). If the print data does not come under the control condition (if "No" is the answer), the print data is transmitted to the printer device driver 68 (S108). Print data that does not come under the control condition (i.e. "No" is the answer) is data that is not controlled. Therefore, it is transmitted to the printer device driver 68 and printed as usual.

The filter 41 informs the printer output supervising driver section 42 of the result of the print data control (S109). When "File 1" in the above-described example is subjected to the "Print Stop" control, the filter 41 deletes the data for printing because it has received the instruction of "Print Stop" from the printer output supervising driver section 42 in advance. Thus, the filter 41 performs a series of control operations for "Print Stop" 103, which is a type of print control.

Similarly, the filter 41 performs the controls of "Load" 104, "Blank Printing" 105, "Watermark" 106, "Print Completion Notification" 107, etc. "Load" 104 can be attained by sending data for printing to the printer device driver 68 at a very low speed instead of deleting the data. Alternatively, a part of data to be printed is repeatedly transmitted to the printer device driver 68. "Blank Printing" 105 is effected by deleting data for printing and outputting an instruction for printing a blank page to the printer device driver 68. "Watermark" 106 is achieved by adding a watermark to data for printing and transmitting the data to the printer device driver 68.

(Print Control Flow 2)

The following is a description of an example in which print control is performed by utilizing the function of the spooler 65 but not the filter 68. Upon receipt of an instruction for the print control of "Spooler Read Disabling" 109, the printer output supervising driver section 42 starts to supervise a temporary file created by the spooler 65. More specifically, the printer output supervising driver section 42 receives temporary file write information at every given time interval to supervise whether or not writing of a temporary file has been completed. Upon completion of writing a temporary file, the printer output supervising driver section 42 rewrites the attribute of the temporary file so that the spooler 65 cannot read the file.

Accordingly, the spooler 65 cannot subsequently read the temporary file and pass it to the language monitor 66. Thus, it becomes impossible to perform printing subsequently. In the case of "Write Success Notification" 108, the printer output supervising driver section 42 deletes the temporary file written to the hard disk by the spooler 65, and creates an empty file with a similar filename. At this time, it seems to the spooler 65 that the creation of a temporary file has succeeded. Therefore, the spooler 65 moves to the subsequent processing as usual. Eventually, the empty file is printed. The data to be actually printed is not printed.

The foregoing print control is performed by utilizing the function of the spooler 65 or the function of outputting to the printer device driver 68. However, the present invention is not necessarily limited thereto. It is also possible to utilize the function of the language monitor 66, the printer interface driver 64 or the printer graphic driver 63. Further, print control may be performed when data is passed from the GDI32 (61) to the GRE 62 through a filter that is prepared therebetween.

Another Example of Print Control

Figure 3:
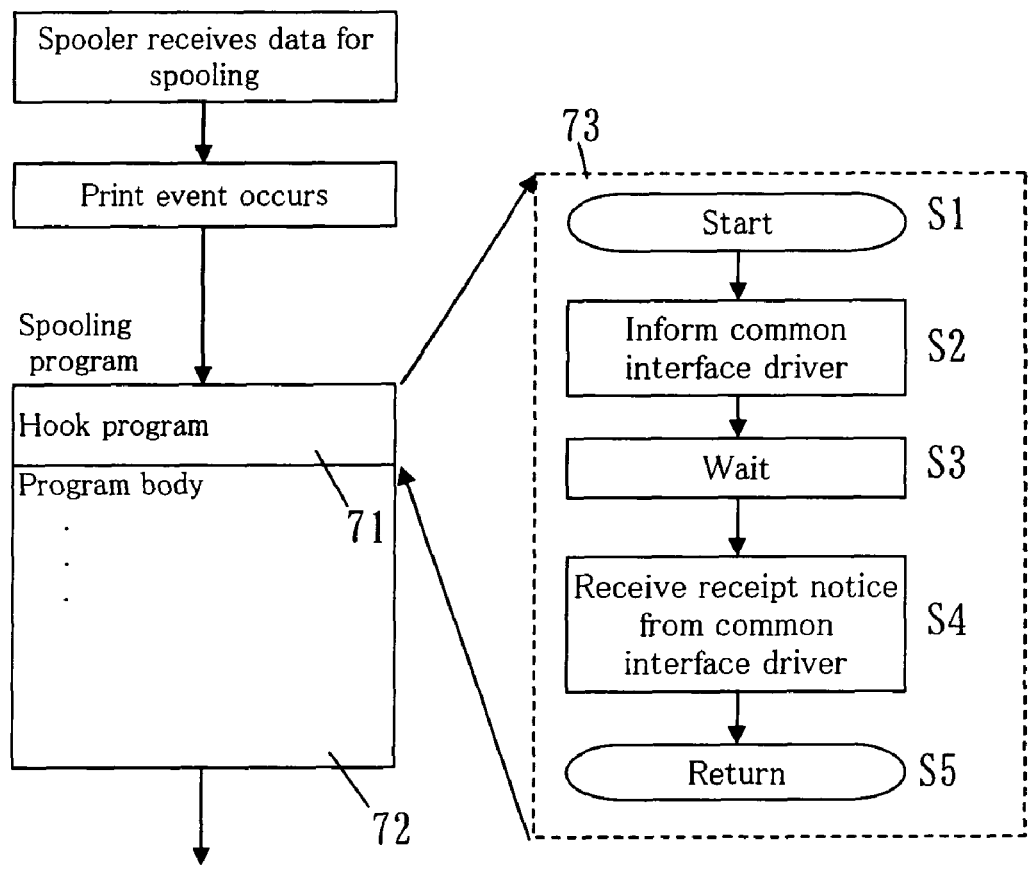
FIG. 3 is a diagram showing the detection of a spooling event.
Figure 7:
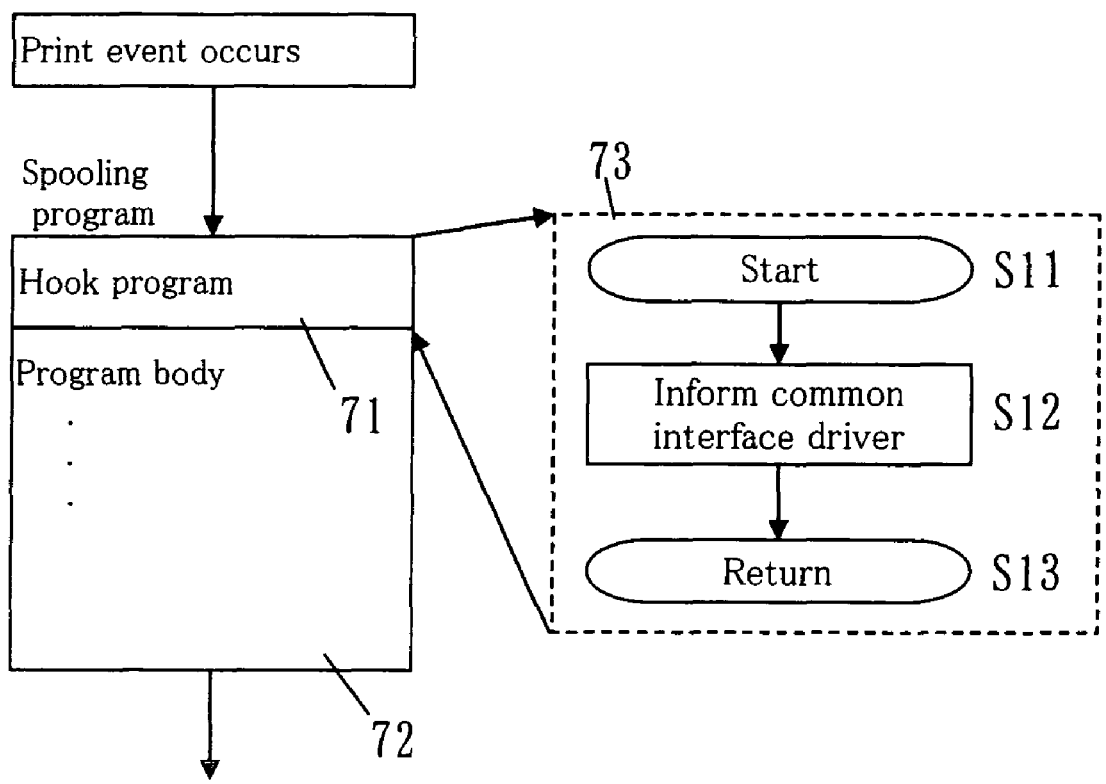
FIG. 7 is a diagram showing another example of the detection of a spooling event.

The detection of a print request by using the spooler 65, which is shown in FIG. 3, may be performed according to another procedure such as that shown in FIG. 7. The spooler 65 receives data for spooling sent from the GDI32 (61) or the printer interface driver 64. When the spooler 65 starts spooling, a spooling event occurs. In response to the occurrence of the spooling event, a hook program 71 registered in association with the spooling event starts operation. The hook program 71 interrupts the spooling program to activate a hook program 73.

The hook program 73 starts (S11), and informs the common interface driver 7 of the occurrence of a print event (S12). Then, the hook program 73 terminates (S13). The control process returns to the spooling program, and the program body 72 of the spooling program starts. Thus, spooling of the data by the spooler 65 is continued.

Second Embodiment

Figure 8:
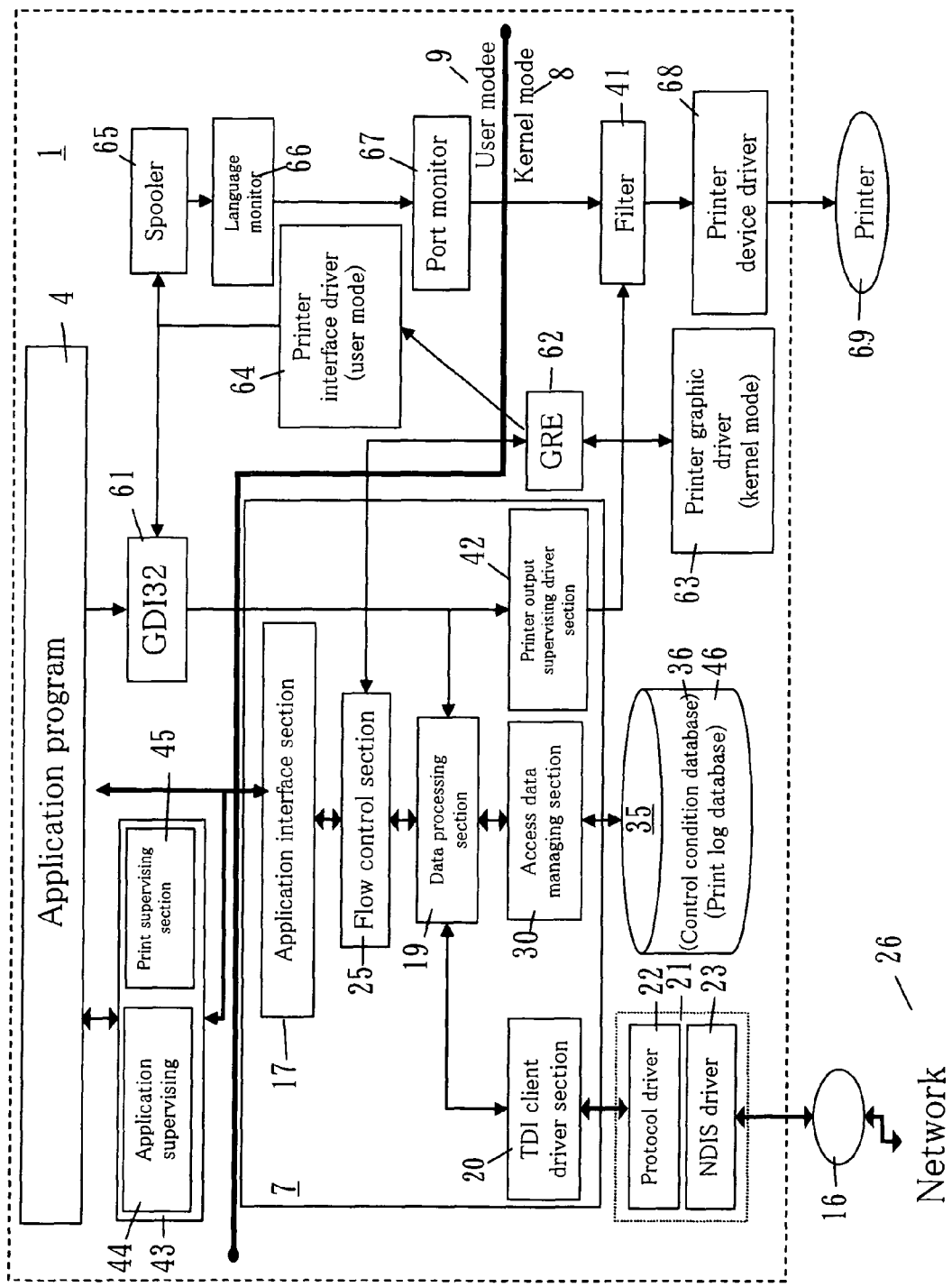
FIG. 8 is a conceptual view showing the outline of the function of a print control program stored in a computer according to a second embodiment of the present invention.

A print control program according to a second embodiment of the present invention obtains a log of outputting to the printer and stores it in the hard disk or the like. FIG. 8 is a diagram showing the outline of the function of the print control program according to the second embodiment. When printing is performed by accessing the printer 69, the following pieces of information are obtainable as those related to the printing: a user who performed printing; the name of a file that was printed; an application that made a print request; a printer; print conditions; the date at which printing was performed; etc. The print conditions are pieces of information set when a file is going to be printed, such as a paper size, a print direction, a number of copies to be printed, color setting (black-and-white/color printing), image quality, layout setting, and page designation.

When printing is performed, these pieces of information can be obtained and stored as a log file. FIG. 9 illustrates an example of a log file. The log file is in the form of a table 110 consisting of columns respectively entitled "User" 111, "Printed File Name" 112, "Application" 113, "Printer" 114, "Print Condition" 115, "Date" 116, and "Type of Control" 117. The column of "User" 111 shows users who performed printing. That is, the names of users who used the computer 1 to perform printing are listed in the column of "User" 111.

"Printed File Name" 112 is the name of a printed file. "Application" 113 is the name of an application program 4 or a service that executed printing. "Printer" 114 is the name of a printer that printed. "Print Condition" 115 is a print condition (described above) set when a file was going to be printed. "Date" 116 is the date at which printing was performed. For example, "10 hours, 45 minutes and 05 seconds on Nov. 1, 2002" is entered in the column of "Date" 116.

"Type of Control" 117 is a column showing a control effected when a file was printed. "Type of Control" 117 is "Type of Control" 102 in the table 100 shown in FIG. 2. The log file is formed by obtaining information through the common interface driver 7 and stored in the hard disk or the like of the computer 1. The log file may be stored in the form of a database. Alternatively, the log file may be stored in a storage device of another computer or the like connected to the network 26.

Figure 10:
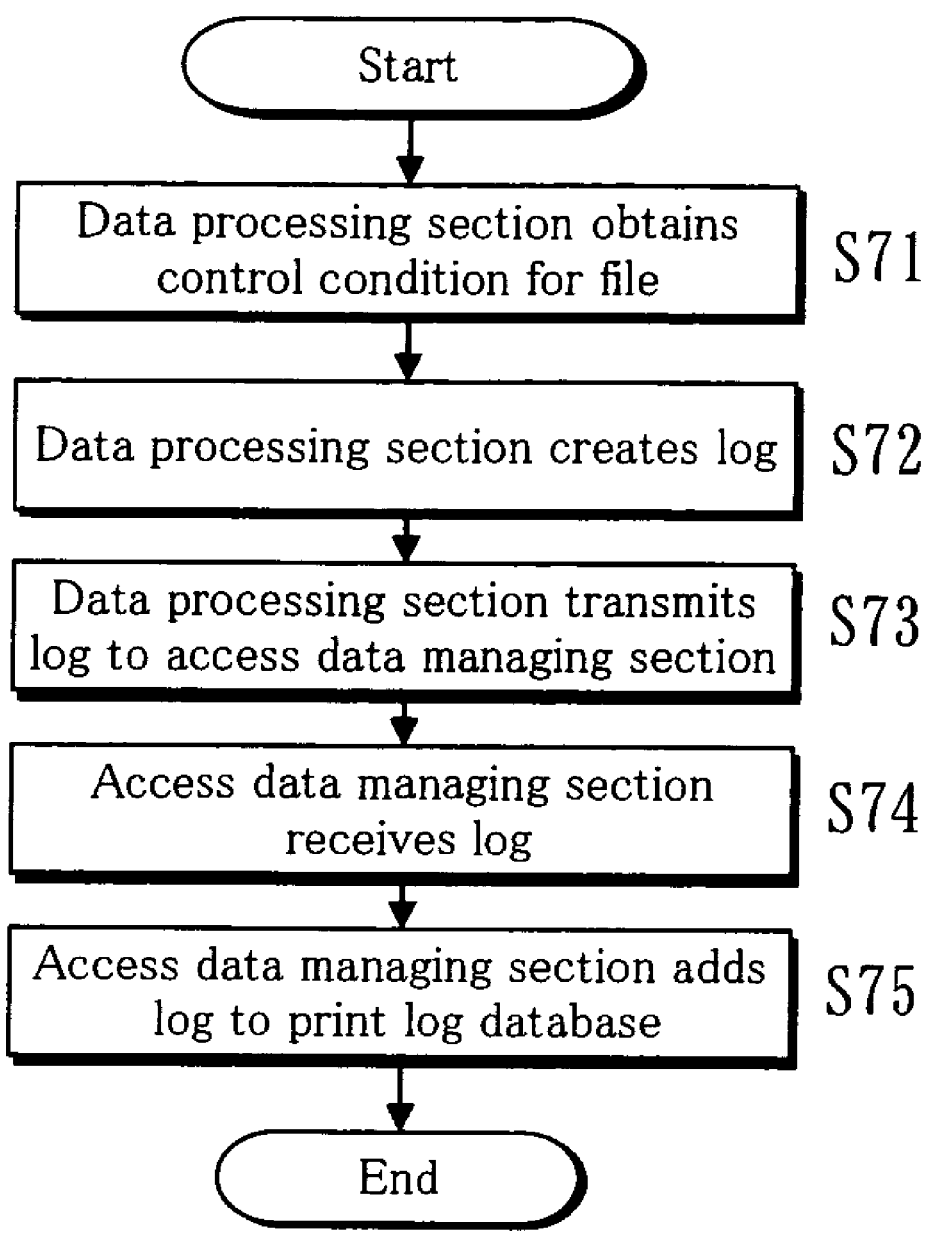
FIG. 10 is a flowchart showing the operation of obtaining a print log.
Figure 11:
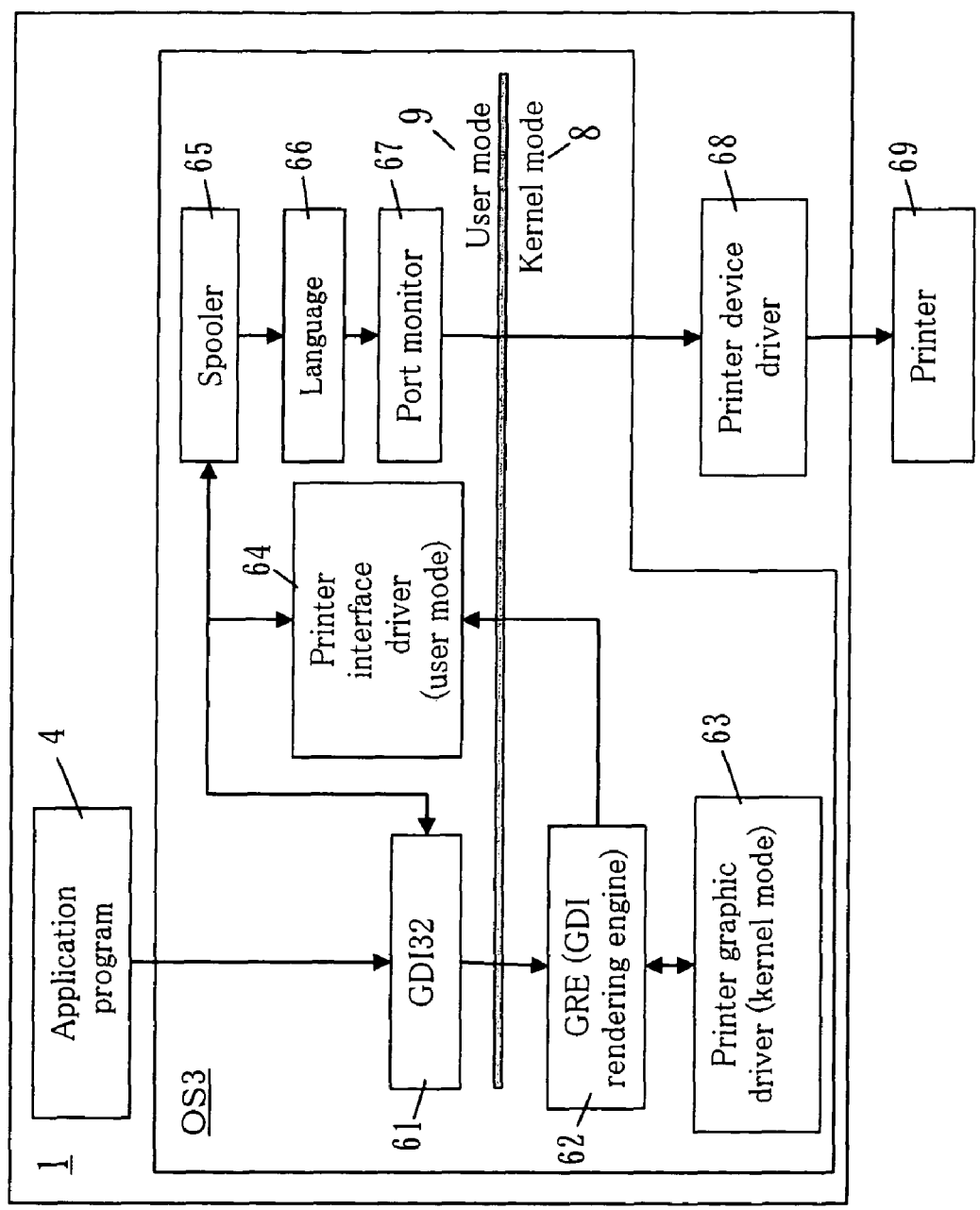
FIG. 11 is a conceptual view showing conventional print-related services.
Figure 12:
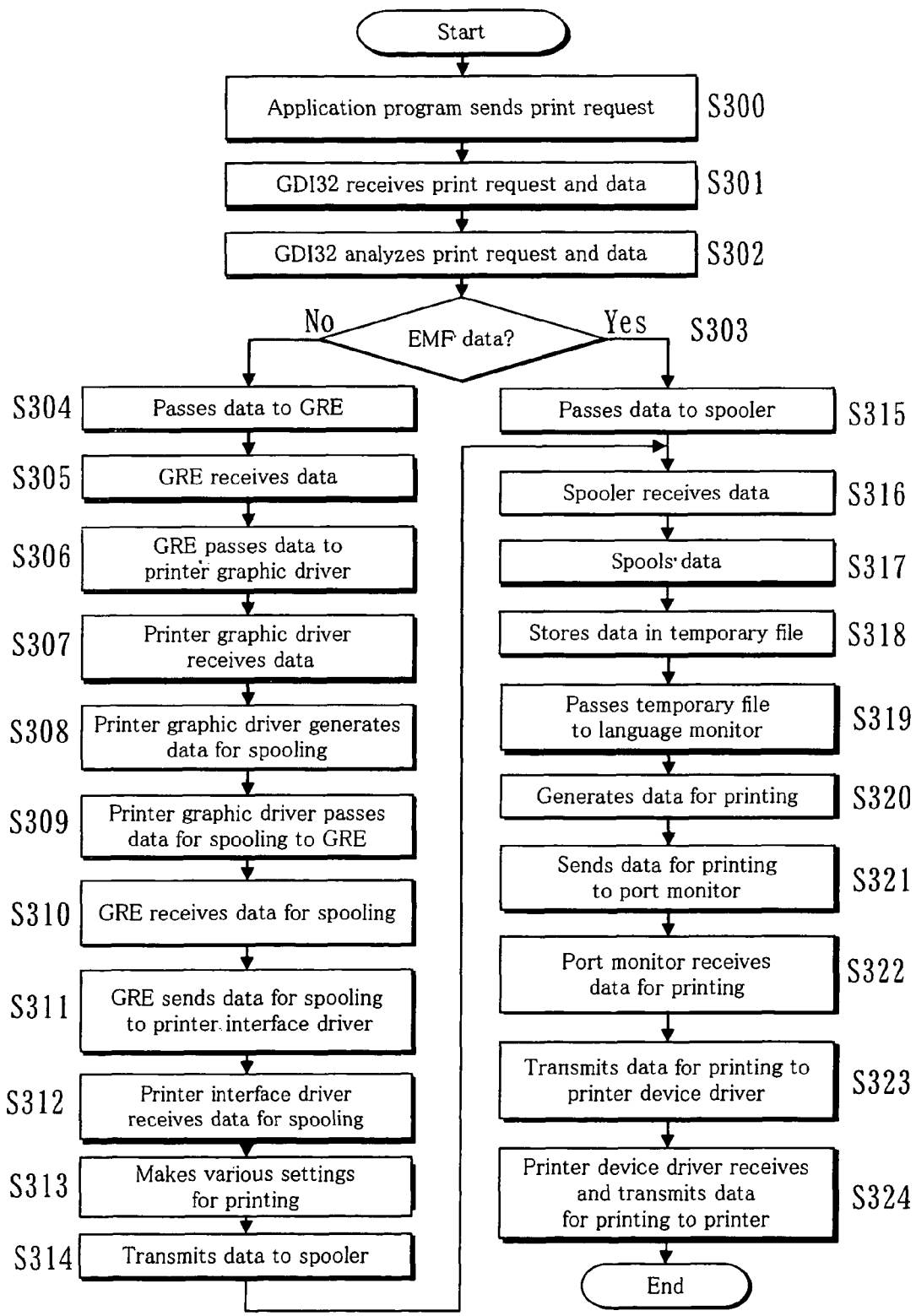
FIG. 12 is a flowchart showing the flow of conventional printing process.

FIG. 10 is a flowchart showing an example of a procedure for obtaining a log file. The flowchart illustrates a procedure for obtaining a log when printing is to be performed. A print request is handled according to the same procedure as in the first embodiment. The following is a description of the procedure carried out from the time when the data processing section 19 obtains a control condition until a log file is created. The data processing section 19 obtains a control condition (S57→S71), and creates a print log (S72).

The log includes information as shown in the table 110 of FIG. 9. The data processing section 19 sends the created log to the access data managing section 30 (S73). The access data managing section 30 receives the log (S74). The access data managing section 30 accesses the database 35 on the hard disk to add the log to a print log database 46 (S75).

Third Embodiment

Figure 13:
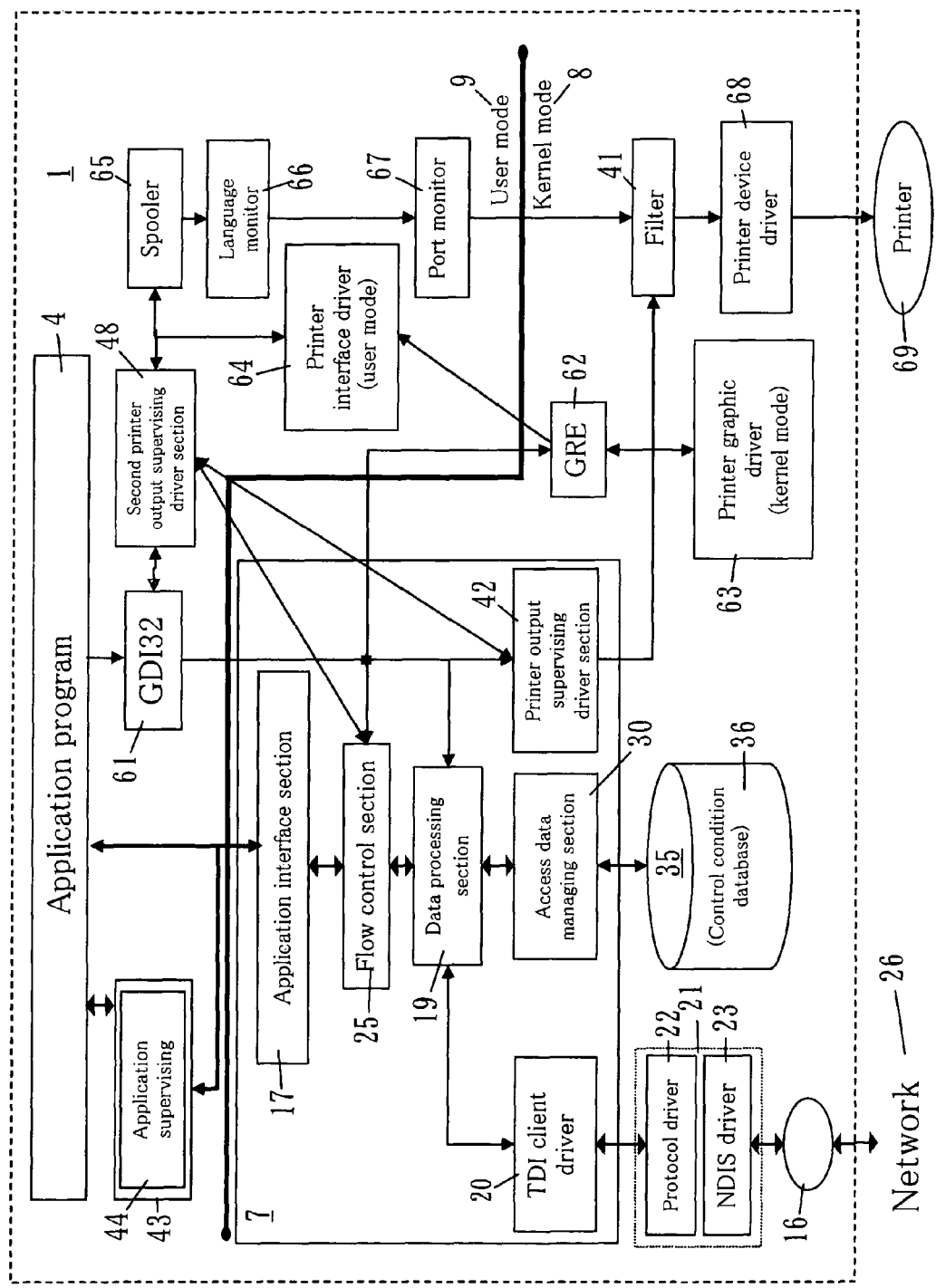
FIG. 13 is a conceptual view showing the outline of the function of a print control program stored in a computer according to a third embodiment of the present invention.

FIG. 13 is a conceptual view showing the function of a print control program according to a third embodiment of the present invention. The print control program of the third embodiment differs from those of the first and second embodiments in that a second printer output supervising driver section 48 is interposed between the GDI32 (61) and the spooler 65. The second printer output supervising driver section 48 has the function of supervising and controlling data output from the GDI32 (61). The third embodiment is the same as the first and second embodiments in terms of the basic function of controlling printing and keeping a history. Only a part in which the third embodiment differs from the first and second embodiments will be described below.

The second printer output supervising driver section 48 is in direct communication with the flow control section 25 and the printer output supervising driver section 42. The printer output supervising driver section 42 performs print control according a designated condition setting. The condition setting allows designation of a printable time period, a printable application, and a user. The flow'control section 25 obtains a control condition from the database 35 and passes it to the printer output supervising driver section 42.

Examples of control conditions are shown in FIG. 14. A control condition table 120 consists of columns respectively entitled "File" 121, "Printable Period" 122, "Unprintable Application" 123, "User" 124, and "Control" 125. "File" 121 shows files to be controlled. "Printable Period" 122 is a column that shows a period of time during which printing can be performed. In the column of "Printable Period" 122, the start and end time of printing are designated. "Printable Period" 122 may be designated by a specific date or a specific date and time.

"Unprintable Application" 123 shows an application program to be subjected to print control. "User" 124 shows a user to be subjected to print control. "Control" 125 shows a type of print control to be performed. For example, "Control" 125 may be as follows: "Print inhibit" that inhibits printing; "Print permission" that permits printing; and "Standby" that holds printing on standby.

A user operates an application program 4 to perform printing. A print instruction is issued from the application program 4, and print data is passed to the GDI32 (61) and then passed to the spooler 65. The second printer output supervising driver section 48, which is interposed between the GDI32 (61) and the spooler 65, checks the print data whether or not it comes under a print control condition.

Print control conditions have been stored in the control condition database 36 and passed to the printer output supervising driver section 42 by the flow control section 25. Meanwhile, the common interface driver 7 always supervises the application program 4 and the user operating it. The name of the application program 4 and information about the user, which are obtained from the supervision information, are passed to the second printer output supervising driver section 48.

Therefore, the second printer output supervising driver section 48 can judge whether or not the print data comes under a control condition. If the print data is judged to be unprintable, the second printer output supervising driver section 48 returns a "Print Error" message to the GDI32 (61), but does not pass the print data to the spooler 65. If the print data is judged to be printable, the second printer output supervising driver section 48 passes the print data to the spooler 65.

The second printer output supervising driver section 48 can perform transmission and reception of data with the printer output supervising driver section 42. The printer output supervising driver section 42 can instruct the filter 41 to perform print control in response to an instruction from the second printer output supervising driver section 48.

FIELD OF INDUSTRIAL APPLICATION

The present invention has the following advantages. When printing is performed from a computer, it possible to obtain and store a log of printing and to perform print data control and print control. Accordingly, it is possible to enhance security if the present invention is used by being incorporated in management systems in fields where the management of print data is important, e.g. management systems handling personal data, national classified information, corporate secret data, etc., and the management of print data is facilitated.

What is claimed is:

1. A computer storing a print control program, said program including:
   detecting means (43) that detects, when print data is output to a printer (69) from the computer operating under an operating system (OS), a print request and output data sent from an application program (4) running on said operating system to said printer (69) to perform printing;
   a spooler (65) that processes said output data to generate said print data, temporarily stores said print data generated in a storage medium, and outputs said print data to said printer (69); and
   control means (7, 41) that controls said output data sent from said application program (4) to said printer (69) to perform printing;
   wherein said control means (7, 41) includes:
   a common interface driver (7) that operates in a kernel mode of said operating system in which all instructions for said operating system (OS) are executable, to perform transmission and reception of data between a plurality of device drivers of said computer;
   a supervising section (43) that operates in a user mode of said operating system (OS) to supervise events generated by said operating system (OS); and
   a filter (41) that operates in the kernel mode, in which all instructions for said operating system (OS) are executable, said filter (41) being inserted upstream of a printer device driver (68), which controls said printer (69), to control said print data sent from said spooler (65) to said printer (69);
   said common interface driver (7) including:
   an application interface section (17) that is an interface between said common interface driver (7) and said application program;
   a printer output supervising driver section (42) that checks a control condition for controlling said print data and transmits an instruction for control to said filter (41); and
   a data input/output section (20, 30) that makes access to a storage device to obtain said control condition and passes it to said printer output supervising driver section (42);
   wherein said supervising section (43) detects said print request in response to an event occurring when said spooler (65) operates, and passes said print request detected to said printer output supervising driver section (42) through said application interface section (17);
   said printer output supervising driver section (42) receives said print request and transmits a control instruction corresponding to said print request to said filter (41); and
   said filter (41) controls said print data in response to said control instruction,
   wherein said common interface driver has functions (I) for being a common window of said device drivers and for performing communication between said device driver and said application program, (II) for sending and receiving data between said plurality of device drivers or between said application program and said device driver when a request is made by said application program, (III) when an access is made from said application program to a specific file stored in said storage device of said electronic computer, for receiving an access request from said application program to said specific file through a standard interface of said operating system (OS), and for providing data communication between said application and said storage device, and
   wherein said common interface driver provides an interface between the plurality of device drivers being operating in the kernel mode to perform transmission and reception of data between the plurality of device drivers via the common interface driver.

2. The computer according to claim 1, wherein
   said control condition includes a file name of a print data, and a control type for controlling said print data,
   wherein said control type is at least one selected from the group consisting of stopping an output of said print data, changing an output speed of said print data, printing a blank page instead of said print data, and printing a watermark including a specific character or a sentence over said print data, and
   wherein said printer output supervising driver section (42) receives said print request and transmits a control instruction for controlling said print data by said control type corresponding to said print request to said filter (41).

3. A computer storing a print control program, said program including:
   detecting means (43) that detects, when print data is output to a printer (69) from the computer operating under an operating system (OS), a print request and output data sent from an application program (4) running on said operating system to said printer (69) to perform printing;
   a spooler (65) that processes said output data to generate said print data, temporarily stores said print data generated in a storage medium, and outputs said print data to said printer (69); and
   control means (7, 41) that controls said output data sent from said application program (4) to said printer (69) to perform printing;
   wherein said control means (7, 41) includes:
   a common interface driver (7) that operates in a kernel mode of said operating system in which all instructions for said operating system (OS) are executable, to perform transmission and reception of data between a plurality of device drivers of said computer; and
   a supervising section (43) that operates in a user mode of said operating system (OS) to supervise events generated by said operating system (OS);
   said common interface driver (7) including:
   an application interface section (17) that is an interface between said common interface driver (7) and said application program;

a printer output supervising driver section (42) that checks a control condition for controlling said print data and controls said print data; and a data input/output section (20, 30) that makes access to a storage device to obtain said control condition and passes it to said printer output supervising driver section (42);

wherein said supervising section (43) detects said print request in response to an event occurring when said spooler (65) operates, and passes said print request detected to said printer output supervising driver section (42) through said application interface section (17); and said printer output supervising driver section (42) receives said print request and controls a spooler temporary file created and stored by said spooler (65) according to said control condition, wherein said common interface driver has functions (I) for being a common window of said device drivers and for performing communication between said device driver and said application program, (II) for sending and receiving data between said plurality of device drivers or between said application program and said device driver when a request is made by said application program, (III) when an access is made from said application program to a specific file stored in said storage device of said electronic computer, for receiving an access request from said application program to said specific file through a standard interface of said operating system (OS), and for providing data communication between said application and said storage device, and wherein said common interface driver provides an interface between the plurality of device drivers being operating in the kernel mode to perform transmission and reception of data between the plurality of device drivers via the common interface driver.

4. The computer according to claim 3, wherein said control condition is at least one selected from the group consisting of changing an attribute of said spooler temporary file, changing contents of said spooler temporary file, and a control whereby contents of said spooler temporary file are deleted to make said file empty.

5. The computer according to claim 3, wherein
said control condition includes a file name of a print data, and a control type for controlling said print data,
wherein said control type is at least one selected from the group consisting of changing an attribute of said spooler temporary file, changing contents of said spooler temporary file, and deleting contents of said spooler temporary file to make said file empty.

6. A computer storing a print control program, said program including:
detecting means (43) that detects, when print data is output to a printer (69) from the computer operating under an operating system (OS), a print request and output data sent from an application program (4) running on said operating system to said printer (69) to perform printing;
a spooler (65) that processes said output data to generate said print data, temporarily stores said print data generated in a storage medium, and outputs said print data to said printer (69); and
control means (7, 41) that controls said output data sent from said application program (4) to said printer (69) to perform printing;
wherein said control means (7, 41) includes:
a common interface driver (7) that operates in a kernel mode of said operating system in which all instructions for said operating system (OS) are executable, to perform transmission and reception of data between a plurality of device drivers of said computer; and
a second printer output supervising driver section (48) that operates in a user mode of said operating system (OS), said second printer output supervising driver section (48) being inserted upstream of said spooler (65) to control said output data sent from said application program (4) to said spooler (65);
said common interface driver (7) including:
an application interface section (17) that is an interface between said common interface driver (7) and said application program;
a first printer output supervising driver section (42) that checks a control condition for controlling said print data and transmits an instruction for control to said second printer output supervising driver section (48); and
a data input/output section (20, 30) that makes access to a storage device to obtain said control condition and passes it to said first printer output supervising driver section (42);
wherein said output data is passed to said spooler (65) through said second printer output supervising driver section (48); and
said second printer output supervising driver section (48) receives said control condition and said control instruction from said first printer output supervising driver section (42) and controls said print data,
wherein said common interface driver has functions (I) for being a common window of said device drivers and for performing communication between said device driver and said application program, (II) for sending and receiving data between said plurality of device drivers or between said application program and said device driver when a request is made by said application program, (III) when an access is made from said application program to a specific file stored in said storage device of said electronic computer, for receiving an access request from said application program to said specific file through a standard interface of said operating system (OS), and for providing data communication between said application and said storage device, and
wherein said common interface driver provides an interface between the plurality of device drivers being operating in the kernel mode to perform transmission and reception of data between the plurality of device drivers via the common interface driver.

7. The computer according to claim 6, wherein
said control condition includes a file name, a user operating said application program, a printable time, an unprintable application program which is prohibited printing, and a control type,
wherein said control type is at least one selected from the group consisting of prohibiting printing, allowing printing, and waiting printing, and
wherein said second printer output supervising driver section (48) receives a name of said application program, and a user information from said common interface driver (7).

8. A computer storing a print control program, said program including:
detecting means (43) that detects, when print data is output to a printer (69) from the computer operating under an operating system (OS), a print request and output data sent from an application program (4) running on said operating system to said printer (69) to perform printing;

a spooler (65) that processes said output data to generate said print data, temporarily stores said print data generated in a storage medium, and outputs said print data to said printer (69); and control means (7, 41) that controls said output data sent from said application program (4) to said printer (69) to perform printing;

wherein said control means (7, 41) includes:

a common interface driver (7) that operates in a kernel mode of said operating system in which all instructions for said operating system (OS) are executable, to perform transmission and reception of data between a plurality of device drivers of said computer;

a second printer output supervising driver section (61) that operates in a user mode of said operating system (OS), said second printer output supervising driver section (48) being inserted upstream of said spooler (65) to control said output data sent from said application program (4) to said spooler (65);

a filter (41) that operates in the kernel mode, in which all instructions for said operating system (OS) are executable, said filter (41) being inserted upstream of a printer device driver (68), which controls said printer (69), to control said print data sent from said spooler (65) to said printer (69);

said common interface driver (7) including:

an application interface section (17) that is an interface between said common interface driver (7) and said application program (4);

a first printer output supervising driver section (42) that checks a control condition for controlling said print data and transmits an instruction for control to said filter (41); and a data input/output section (20, 30) that makes access to a storage device to obtain said control condition and passes it to said first printer output supervising driver section (42);

wherein said second printer output supervising driver section (48) detects said print request when said output data is passed to said spooler (65) through said second printer output supervising driver section (48), and passes said print request detected to said first printer output supervising driver section (42) through said application interface section (17); and wherein said output data is passed to said spooler (65) through said second printer output supervising driver section (48);

said second printer output supervising driver section (48) detects said print request when said output data is sent to said spooler (65) and passes said print request detected to said first printer output supervising driver section (42) through said application interface section (17);

said first printer output supervising driver section (42) receives said print request and transmits a control instruction corresponding to said print request to said filter (41); and said filter (41) controls said print data in response to said control instruction, wherein said common interface driver has functions (I) for being a common window of said device drivers and for performing communication between said device driver and said application program, (II) for sending and receiving data between said plurality of device drivers or between said application program and said device driver when a request is made by said application program, (III) when an access is made from said application program to a specific file stored in said storage device of said electronic computer, for receiving an access request from said application program to said specific file through a standard interface of said operating system (OS), and for providing data communication between said application and said storage device, and wherein said common interface driver provides an interface between the plurality of device drivers being operating in the kernel mode to perform transmission and reception of data between the plurality of device drivers via the common interface driver.

9. The computer according to claim 8, wherein said control condition includes a file name, a user operating said application program, a printable time, an unprintable application program which is prohibited printing, and a control type, and wherein said control type is at least one selected from the group consisting of prohibiting printing, allowing printing, and waiting printing.

10. The computer according to any one of claims 1, 6 and 8, wherein said control condition is at least one selected from the group consisting of stopping output of said print data, changing an output speed of said print data, and repeatedly outputting a part of said print data.

11. A non-transitory recording medium containing a print control program for use in a computer, said print control program comprising:

detecting means (43) that detects, when print data is output to a printer (69) from the computer operating under an operating system (OS), a print request and output data sent from an application program (4) running on said operating system to said printer (69) to perform printing;

a spooler (65) that processes said output data to generate said print data, temporarily stores said print data generated in a storage medium, and outputs said print data to said printer (69); and control means (7, 41) that controls said output data sent from said application program (4) to said printer (69) to perform printing;

wherein said control means (7, 41) includes:

a common interface driver (7) that operates in a kernel mode of said operating system in which all instructions for said operating system (OS) are executable, to perform transmission and reception of data between a plurality of device drivers of said computer;

a supervising section (43) that operates in a user mode of said operating system (OS) to supervise events generated by said operating system (OS); and a filter (41) that operates in the kernel mode, in which all instructions for said operating system (OS) are executable, said filter (41) being inserted upstream of a printer device driver (68), which controls said printer (69), to control said print data sent from said spooler (65) to said printer (69);

said common interface driver (7) including:

an application interface section (17) that is an interface between said common interface driver (7) and said application program;

a printer output supervising driver section (42) that checks a control condition for controlling said print data and transmits an instruction for control to said filter (41); and a data input/output section (20, 30) that makes access to a storage device to obtain said control condition and passes it to said printer output supervising driver section (42);

wherein said supervising section (43) includes the steps of detecting said print request in response to an event occurring when said spooler (65) operates, and passing said print request detected to said printer output supervising driver section (42) through said application interface section (17);

said printer output supervising driver section (42) includes the steps of receiving said print request and transmitting a control instruction corresponding to said print request to said filter (41); and said filter (41) includes the step of controlling said print data in response to said control instruction, wherein said common interface driver has functions (I) for being a common window of said device drivers and for performing communication between said device driver and said application program, (II) for sending and receiving data between said plurality of device drivers or between said application program and said device driver when a request is made by said application program, (III) when an access is made from said application program to a specific file stored in said storage device of said electronic computer, for receiving an access request from said application program to said specific file through a standard interface of said operating system (OS), and for providing data communication between said application and said storage device, and wherein said common interface driver provides an interface between the plurality of device drivers being operating in the kernel mode to perform transmission and reception of data between the plurality of device drivers via the common interface driver.

12. The non-transitory recording medium according to claim 11, wherein said control condition includes a file name of a print data, and a control type for controlling said print data, wherein said control type is at least one selected from the group consisting of stopping an output of said print data, changing an output speed of said print data, printing a blank page instead of said print data, and printing a watermark including a specific character or a sentence over said print data, and wherein said printer output supervising driver section (42) includes the steps of receiving said print request and transmitting a control instruction for controlling said print data by said control type corresponding to said print request to said filter (41).

13. A non-transitory recording medium containing a print control program for use in a computer, said print control program comprising:

detecting means (43) that detects, when print data is output to a printer (69) from the computer operating under an operating system (OS), a print request and output data sent from an application program (4) running on said operating system to said printer (69) to perform printing;

a spooler (65) that processes said output data to generate said print data, temporarily stores said print data generated in a storage medium, and outputs said print data to said printer (69); and control means (7, 41) that controls said output data sent from said application program (4) to said printer (69) to perform printing;

wherein said control means (7, 41) includes:

a common interface driver (7) that operates in a kernel mode of said operating system in which all instructions for said operating system (OS) are executable, to perform transmission and reception of data between a plurality of device drivers of said computer; and a supervising section (43) that operates in a user mode of said operating system (OS) to supervise events generated by said operating system (OS);

said common interface driver (7) including:

an application interface section (17) that is an interface between said common interface driver (7) and said application program;

a printer output supervising driver section (42) that checks a control condition for controlling said print data and controls said print data; and a data input/output section (20, 30) that makes access to a storage device to obtain said control condition and passes it to said printer output supervising driver section (42);

wherein said supervising section (43) includes the steps of detecting said print request in response to an event occurring when said spooler (65) operates, and passing said print request detected to said printer output supervising driver section (42) through said application interface section (17); and said printer output supervising driver section (42) includes the steps of receiving said print request and controlling a spooler temporary file created and stored by said spooler (65) according to said control condition, wherein said common interface driver has functions (I) for being a common window of said device drivers and for performing communication between said device driver and said application program, (II) for sending and receiving data between said plurality of device drivers or between said application program and said device driver when a request is made by said application program, (III) when an access is made from said application program to a specific file stored in said storage device of said electronic computer, for receiving an access request from said application program to said specific file through a standard interface of said operating system (OS), and for providing data communication between said application and said storage device, and wherein said common interface driver provides an interface between the plurality of device drivers being operating in the kernel mode to perform transmission and reception of data between the plurality of device drivers via the common interface driver.

14. The non-transitory recording medium according to claim 13, wherein said control condition is at least one selected from the group consisting of changing an attribute of said spooler temporary file, changing contents of said spooler temporary file, and a control whereby contents of said spooler temporary file are deleted to make said file empty.

15. The non-transitory recording medium according to claim 13, wherein said control condition includes a file name of a print data, and a control type for controlling said print data, wherein said control type is at least one selected from the group consisting of changing an attribute of said spooler temporary file, changing contents of said spooler temporary file, and deleting contents of said spooler temporary file to make said file empty.

16. A non-transitory recording medium containing a print control program for use in a computer, said print control program comprising:

detecting means (43) that detects, when print data is output to a printer (69) from the computer operating under an operating system (OS), a print request and output data sent from an application program (4) running on said operating system to said printer (69) to perform printing;

a spooler (65) that processes said output data to generate said print data, temporarily stores said print data generated in a storage medium, and outputs said print data to said printer (69); and control means (7, 41) that controls said output data sent from said application program (4) to said printer (69) to perform printing;
wherein said control means (7, 41) includes:
a common interface driver (7) that operates in a kernel mode of said operating system in which all instructions for said operating system (OS) are executable, to perform transmission and reception of data between a plurality of device drivers of said computer; and
a second printer output supervising driver section (48) that operates in a user mode of said operating system (OS), said second printer output supervising driver section (48) being inserted upstream of said spooler (65) to control said output data sent from said application program (4) to said spooler (65);
said common interface driver (7) including:
an application interface section (17) that is an interface between said common interface driver (7) and said application program;
a first printer output supervising driver section (42) that checks a control condition for controlling said print data and transmits an instruction for control to said second printer output supervising driver section (48); and
a data input/output section (20, 30) that makes access to a storage device to obtain said control condition and passes it to said first printer output supervising driver section (42);
wherein said output data is passed to said spooler (65) through said second printer output supervising driver section (48); and
said second printer output supervising driver section (48) includes the steps of receiving said control condition and said control instruction from said first printer output supervising driver section (42) and controlling said print data,
wherein said common interface driver has functions (I) for being a common window of said device drivers and for performing communication between said device driver and said application program, (II) for sending and receiving data between said plurality of device drivers or between said application program and said device driver when a request is made by said application program, (III) when an access is made from said application program to a specific file stored in said storage device of said electronic computer, for receiving an access request from said application program to said specific file through a standard interface of said operating system (OS), and for providing data communication between said application and said storage device, and
wherein said common interface driver provides an interface between the plurality of device drivers being operating in the kernel mode to perform transmission and reception of data between the plurality of device drivers via the common interface driver.

17. The non-transitory recording medium according to claim 16, wherein said control condition includes a file name, a user operating said application program, a printable time, an unprintable application program which is prohibited printing, and a control type,
wherein said control type is at least one selected from the group consisting of prohibiting printing, allowing printing, and waiting printing, and
wherein said second printer output supervising driver section (48) receives a name of said application program, and a user information from said common interface driver (7).

18. A non-transitory recording medium containing a print control program for use in a computer, said print control program comprising:
detecting means (43) that detects, when print data is output to a printer (69) from the computer operating under an operating system (OS), a print request and output data sent from an application program (4) running on said operating system to said printer (69) to perform printing;
a spooler (65) that processes said output data to generate said print data, temporarily stores said print data generated in a storage medium, and outputs said print data to said printer (69); and
control means (7, 41) that controls said output data sent from said application program (4) to said printer (69) to perform printing;
wherein said control means (7, 41) includes:
a common interface driver (7) that operates in a kernel mode of said operating system in which all instructions for said operating system (OS) are executable, to perform transmission and reception of data between a plurality of device drivers of said computer;
a second printer output supervising driver section (61) that operates in a user mode of said operating system (OS), said second printer output supervising driver section (48) being inserted upstream of said spooler (65) to control said output data sent from said application program (4) to said spooler (65);
a filter (41) that operates in the kernel mode, in which all instructions for said operating system (OS) are executable, said filter (41) being inserted upstream of a printer device driver (68), which controls said printer (69), to control said print data sent from said spooler (65) to said printer (69);
said common interface driver (7) including:
an application interface section (17) that is an interface between said common interface driver (7) and said application program (4);
a first printer output supervising driver section (42) that checks a control condition for controlling said print data and transmits an instruction for control to said filter (41); and
a data input/output section (20, 30) that makes access to a storage device to obtain said control condition and passes it to said first printer output supervising driver section (42);
wherein said second printer output supervising driver section (48) has the steps of detecting said print request when said output data is passed to said spooler (65) through said second printer output supervising driver section (48), and passing said print request detected to said first printer output supervising driver section (42) through said application interface section (17); and
said first printer output supervising driver section (42) includes the steps of receiving said print request and transmitting a control instruction corresponding to said print request to said filter (41); and
said filter (41) includes the step of controlling said print data in response to said control instruction,
wherein said common interface driver has functions (I) for being a common window of said device drivers and for performing communication between said device driver and said application program, (II) for sending and receiving data between said plurality of device drivers or between said application program and said device driver when a request is made by said application program, (III) when an access is made from said application program to a specific file stored in said storage device of said electronic computer, for receiving an access request from said application program to said specific file through a standard interface of said operating system (OS), and for providing data communication between said application and said storage device, and wherein said common interface driver provides an interface between the plurality of device drivers being operating in the kernel mode to perform transmission and reception of data between the plurality of device drivers via the common interface driver.

19. The non-transitory recording medium according to claim 18, wherein said control condition includes a file name, a user operating said application program, a printable time, an unprintable application program which is prohibited printing, and a control type, and wherein said control type is at least one selected from the group consisting of prohibiting printing, allowing printing, and waiting printing.

20. The non-transitory recording medium according to any one of claims 11, 16 and 18, wherein said control condition is at least one selected from the group consisting of stopping output of said print data, changing an output speed of said print data, and repeatedly outputting a part of said print data.

21. The non-transitory recording medium according to any one of claims 11 to 18, wherein said control condition is at least one selected from the group consisting of a file of print data to be subjected to said print control, a printable time period indicating a period of time during which said print control can be performed, an application program that cannot print said file, and a user.

22. The non-transitory recording medium according to any one of claims 11, 13, 16 and 18, wherein said detecting means comprises the step of activating a hook program in response to said event when it occurs, said hook program having the transmitting step of informing the control means of occurrence of said event.

23. The non-transitory recording medium according to any one of claims 11, 13, 16 and 18, wherein said control means has a function of obtaining a log of execution of said print control and storing it in a log database, said log database comprising at least one selected from the group consisting of a user column showing a user who performed priming, a primed filename column showing a file that was primed, an application program column showing an application program that executed priming, a primer column showing a primer that primed, a print condition column showing a condition setting with which priming was performed, a date column showing a date at which priming was performed, and a print control column showing a type of print control performed.

\* \* \* \* \*